United States Patent
Kim et al.

(10) Patent No.: US 8,844,943 B2
(45) Date of Patent: Sep. 30, 2014

(54) ELECTRONIC CONTROL SUSPENSION SYSTEM FOR VEHICLES

(71) Applicant: Hyundai Motor Company, Seoul (KR)

(72) Inventors: Jong Min Kim, Seoul (KR); Sung Bae Jang, Gyeonggi-Do (KR); Bo Min Kim, Seoul (KR); Dae Sik Ko, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/804,057

(22) Filed: Mar. 14, 2013

(65) Prior Publication Data

US 2014/0167372 A1    Jun. 19, 2014

(30) Foreign Application Priority Data

Dec. 17, 2012    (KR) .................. 10-2012-0147877

(51) Int. Cl.
*B60G 17/00* (2006.01)
*B60G 99/00* (2010.01)

(52) U.S. Cl.
CPC ........ *B60G 99/002* (2013.01); *B60G 2400/252* (2013.01); *B60G 2500/30* (2013.01)
USPC .................................................... 280/5.514

(58) Field of Classification Search
CPC ............... B60G 2500/30; B60G 2400/252
USPC ...................................................... 280/5.514
See application file for complete search history.

(56) References Cited

U.S. PATENT DOCUMENTS

| | | | | |
|---|---|---|---|---|
| 4,717,874 A | * | 1/1988 | Ichikawa et al. | 324/207.16 |
| 5,044,614 A | * | 9/1991 | Rau | 267/221 |
| 5,161,823 A | * | 11/1992 | Davidson | 280/5.51 |
| 5,193,408 A | * | 3/1993 | Fukui et al. | 74/89.35 |
| 5,491,633 A | * | 2/1996 | Henry et al. | 701/36 |
| 6,528,990 B1 | * | 3/2003 | Nyce | 324/207.13 |
| 6,676,119 B2 | * | 1/2004 | Becker et al. | 267/218 |
| 6,761,080 B2 | * | 7/2004 | Lange et al. | 74/89.37 |
| 6,857,625 B2 | * | 2/2005 | Loser et al. | 267/175 |
| 7,135,794 B2 | * | 11/2006 | Kuhnel | 310/80 |
| 7,237,780 B2 | * | 7/2007 | Ohki | 280/6.157 |
| 7,469,910 B2 | * | 12/2008 | Munster et al. | 280/5.514 |
| 7,722,056 B2 | * | 5/2010 | Inoue et al. | 280/5.512 |
| 7,780,177 B2 | * | 8/2010 | Michel | 280/124.146 |
| 7,874,561 B2 | * | 1/2011 | Michel | 280/6.157 |

(Continued)

FOREIGN PATENT DOCUMENTS

| | | | | |
|---|---|---|---|---|
| DE | 102006032178 A1 | * | 1/2008 | B60G 11/15 |
| EP | 2135756 A1 | * | 12/2009 | F16F 9/54 |

(Continued)

*Primary Examiner* — Nicole Verley
(74) *Attorney, Agent, or Firm* — Edwards Wildman Palmer LLP; Peter F. Corless

(57) ABSTRACT

Disclosed herein is an electronic control suspension (ECS) system for vehicles. The ECS system includes a strut assembly which is coupled to a vehicle body and a lower portion of which is inserted through the housing to absorb the rocking from the wheel. The system further includes a vehicle height control module at a lower portion of the strut assembly, wherein the control module includes a spiral guide groove formed in the strut assembly and a guide member fitted into the guide groove. The guide member is rotated using a motor to move the guide member along the guide groove to cause the strut assembly to be moved vertically to control the height of a vehicle.

8 Claims, 5 Drawing Sheets

(56) References Cited

U.S. PATENT DOCUMENTS

| | | | |
|---|---|---|---|
| 7,905,157 B2 * | 3/2011 | Shige et al. | 74/424.82 |
| 7,926,822 B2 * | 4/2011 | Ohletz et al. | 280/5.514 |
| 7,959,135 B2 * | 6/2011 | Voelkel | 267/64.21 |
| 7,963,529 B2 * | 6/2011 | Oteman et al. | 280/5.515 |
| 8,113,522 B2 * | 2/2012 | Oteman et al. | 280/5.515 |
| 8,262,100 B2 * | 9/2012 | Thomas | 280/5.514 |
| 8,285,448 B2 * | 10/2012 | Inoue et al. | 701/37 |
| 8,370,022 B2 * | 2/2013 | Inoue et al. | 701/37 |
| 8,371,588 B2 * | 2/2013 | Kohlhauser et al. | 280/5.514 |
| 8,469,370 B2 * | 6/2013 | Kondo et al. | 280/5.514 |
| 8,573,573 B2 * | 11/2013 | Michel | 267/218 |
| 8,602,429 B2 * | 12/2013 | Nguyen | 280/124.162 |
| 2006/0113933 A1 * | 6/2006 | Blanding et al. | 318/116 |
| 2006/0163863 A1 * | 7/2006 | Ellmann et al. | 280/788 |
| 2008/0164111 A1 * | 7/2008 | Inoue et al. | 188/297 |
| 2009/0121398 A1 * | 5/2009 | Inoue | 267/140.14 |
| 2010/0025946 A1 * | 2/2010 | Inoue et al. | 280/6.157 |
| 2011/0210525 A1 * | 9/2011 | Michel | 280/5.5 |
| 2012/0187640 A1 * | 7/2012 | Kondo et al. | 280/5.514 |
| 2012/0306170 A1 * | 12/2012 | Serbu et al. | 280/5.514 |
| 2013/0049310 A1 * | 2/2013 | Renninger | 280/5.514 |

FOREIGN PATENT DOCUMENTS

| | | |
|---|---|---|
| JP | 2001-301436 A | 10/2001 |
| KR | 10-2011-0057667 A | 6/2011 |
| KR | 10-2012-0007857 A | 1/2012 |
| WO | WO 2009077099 A1 * | 6/2009 |
| WO | WO 2010078923 A1 * | 7/2010 |

* cited by examiner

ELECTRONIC CONTROL SUSPENSION SYSTEM FOR VEHICLES

CROSS-REFERENCE TO RELATED APPLICATION

This application claims under 35 U.S.C. §119(a) the benefit of Korean Patent Application No. 10-2012-0147877 filed on Dec. 17, 2012 the entire contents of which are incorporated herein by reference.

BACKGROUND OF THE INVENTION

1. Field of the Invention

The present invention relates, in general, to an electronic control suspension (ECS) system for vehicles and, more particularly, to an electronic control suspension (ECS) system for vehicles which is configured to automatically control the height of a vehicle by changing a position of a strut assembly having a shock absorber using a motor.

2. Description of the Related Art

Generally, a suspension system is understood to be a system that includes a shock absorber, a spring, a suspension arm, etc. and is configured to absorb shocks occurring from the road to thus minimize the shock transmitted to a vehicle body or an occupant Such a suspension system is supported by the spring and the shock absorber in a vertical direction, and properly trades off stiffness against compliance in other directions, thereby mechanically adjusts the relative movement between a vehicle body and wheels. Further, the suspension system also operates to maintain tires in close contact with the ground, allowing the vehicle body to be close to the ground when driven at a high speed.

However, when the vehicle body is low to the ground, vehicles may collide with or scrape speed bumps on the road or uneven portions on unpaved roads while driving, and when driving conditions such as a rolling action, a pitching action, etc. occur, vehicles are inclined accordingly, decreasing driving comfort and steering stability.

Thus, for automatic control of a vehicle position, an electronic control suspension for electronic control of a shock absorber has been developed and used, and an active suspension which employs a reactive hydraulic system has been developed as an alternative to using a plate and a shock absorber to control vehicle vibrations, allowing driving stability and steering stability to be obtained.

However, the existing active suspension requires various elements such as a hydraulic pump, a reservoir, a hydraulic line, a hydraulic cylinder, and the like, making the existing system a complicated active suspension system, which also lowers fuel efficiency by the nature of a hydraulic mechanism, and increases $CO_2$ emissions.

Furthermore, some suspension systems merely provide a general strut structure, so it cannot control the position of a vehicle by changing a position of a strut assembly and thereby automatically controlling the height of the vehicle.

The description regarding the related art is provided only for understanding of the background of the invention, so it should not be construed by ordinarily skilled persons in the art to be admitted to be the related art.

SUMMARY

Accordingly, the present invention provides an electronic control suspension system for vehicles which is configured to automatically control the height of a vehicle by changing a vertical position of a strut assembly using a rotating force of a motor.

According to one aspect of the present invention, an electronic control suspension (ECS) system for vehicles includes: a housing having an open upper end and a lower end coupled to a wheel; a strut assembly coupled to a vehicle body at its upper end and a lower portion of which is inserted through the upper end of the housing to absorb rocking transmitted from the wheel; and a vehicle height control module disposed at a lower portion of the strut assembly and having a spiral guide groove in the lower portion of the strut assembly and a guide member fitted into the guide groove, wherein the guide member is rotated using a rotating force from a motor to move the guide member along the guide groove to cause the strut assembly to be moved vertically to control the height of a vehicle.

The vehicle height control module may include: the motor providing forward and backward rotations; a guide pipe fixed to the lower portion of the strut assembly with the spiral guide groove formed in a circumference thereof; and a rotary shaft with the guide member fixed to an upper end thereof to allow the guide member to be fitted into the guide groove. The guide groove may include a horizontal linear section, in which the guide member is positioned when a vehicle travels along a linear road. The guide member may be a bearing. The housing may include a stopper on an upper inner circumferential surface thereof, wherein the stopper is configured to prevent the upward movement of the strut assembly.

A radial upper seat may be disposed in the side of the upper end of the guide pipe, a radial lower seat may be disposed in the side of the lower end of the rotary shaft, and an elastic member may be disposed between the upper seat and the lower seat to provide an elastic force to the strut assembly, wherein the elastic member may be a spring. The upper seat may be supported on an inner circumferential surface of the housing to allow a first bearing to be mounted between the upper seat and the housing. A second bearing may be mounted between the rotary shaft and the housing, and a third bearing may be mounted between the rotary shaft and the strut assembly.

According to the present invention, an electronic control suspension (ECS) system may be configured to control a position of a vehicle in real time when the vehicle is in a variety of driving conditions such as turning, braking, accelerating, etc., thereby improving steering stability under the control of rolling, yawing, pitching, or the like, and driving comfort while reducing a rolling action.

Moreover, the ECS system may be configured to maintain a position of a vehicle when the vehicle is travelling over raised portions or an uneven portions of the road, while maintaining a substantially consistent height of the vehicle despite the weight of occupants and freight loaded in the vehicle. Thus, the height of the vehicle may be lowered at a substantially high speed, improving driving comfort and fuel efficiency, and the height of a vehicle may be raised when the vehicle is driven in an off road condition, protecting the vehicle body from contacting the ground.

BRIEF DESCRIPTION OF THE DRAWINGS

The above and other objects, features, and advantages of the present invention will be more clearly understood from the following detailed description when taken in conjunction with the accompanying drawings, in which.

DETAILED DESCRIPTION

Figure 1:
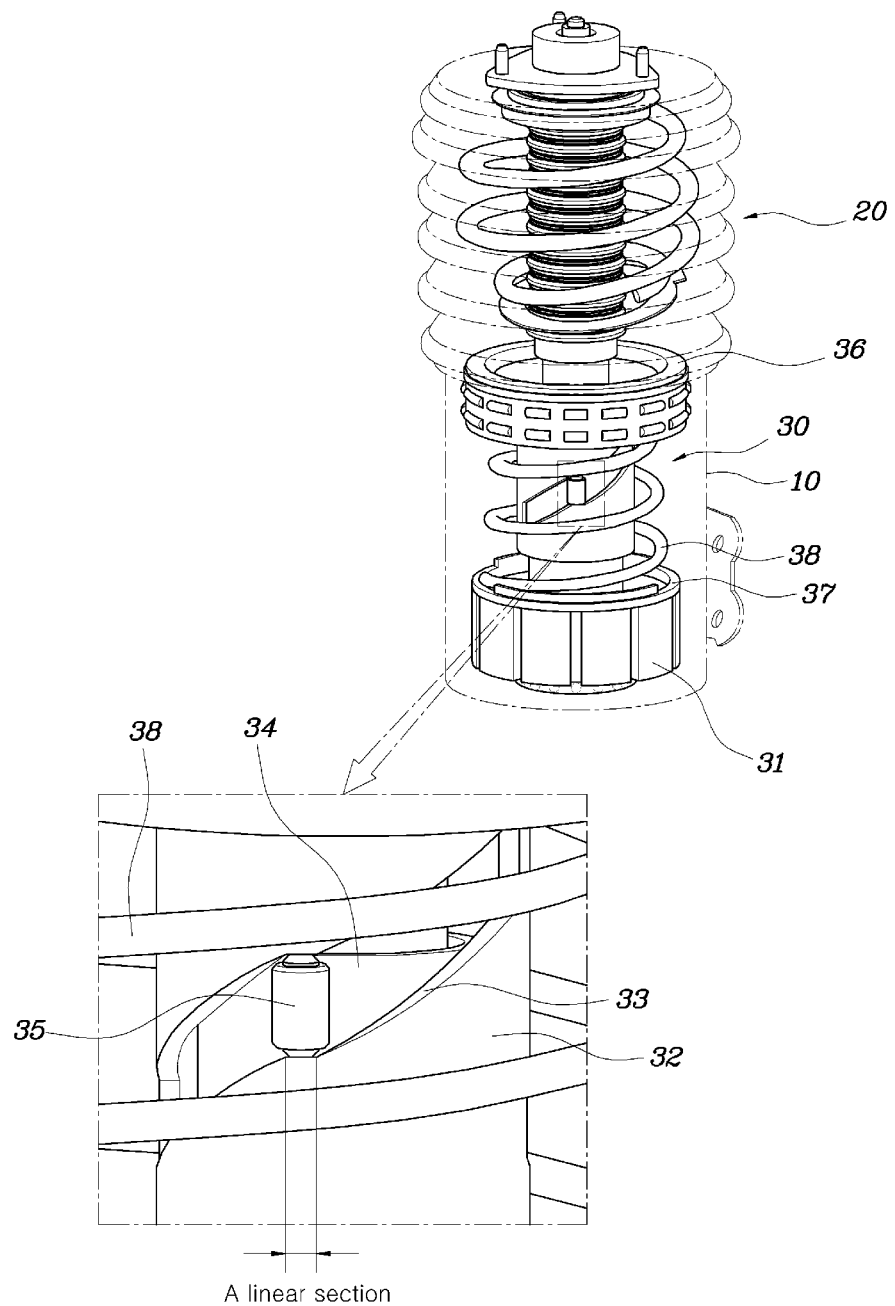
FIG. 1 is an exemplary detailed view showing the construction of an electronic control suspension (ECS) system for vehicles according to an exemplary embodiment of the present invention and the coupled structure of a guide groove and a guide member.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Reference will now be made in detail to exemplary embodiments of the invention, an example of which is illustrated in the accompanying drawings. Wherever possible, the same reference numerals will be used throughout the drawings and the description to refer to the same or like parts.

Figure 2:
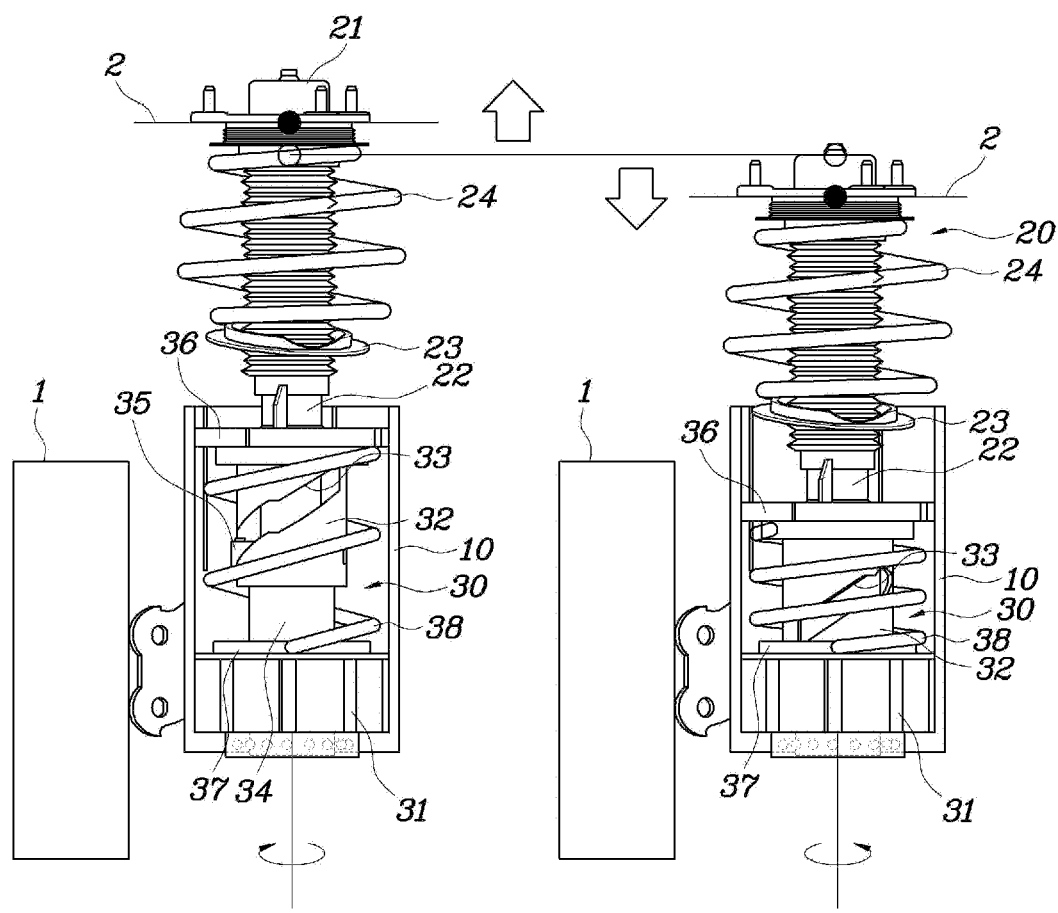
FIG. 2 is an exemplary view illustrating the operation of controlling the height of a vehicle using the ECS system according to an exemplary embodiment of the present invention.
Figure 3:
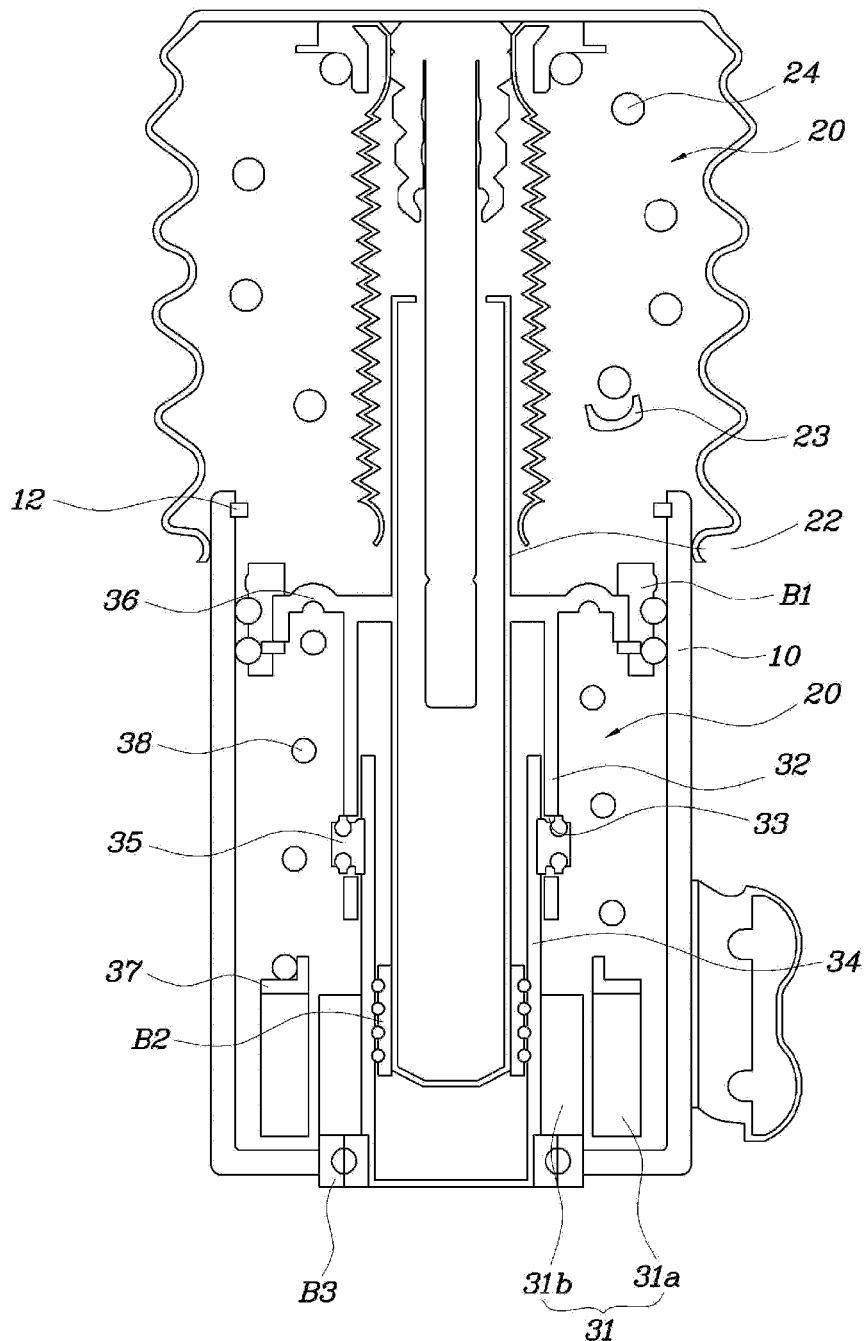
FIG. 3 is an exemplary cross-sectional view showing the structure of a vehicle height control module according to an exemplary embodiment of the present invention.

FIG. 1 is an exemplary detailed view showing the construction of an electronic control suspension (ECS) system for vehicles according to the present invention and the coupled structure of a guide groove 33 and a guide member 35, FIG. 2 is an exemplary view illustrating the operation of controlling the height of a vehicle using the ECS system, and FIG. 3 is an exemplary cross-sectional view showing the structure of a vehicle height control module 30.

Referring to FIG. 1, the ECS system may include a housing 10, a strut assembly 20, and a vehicle height control module 30. Specifically, the ECS system may include a housing 10 having an open upper end and a lower end coupled to a wheel 1, a strut assembly 20 coupled to a vehicle body 1 at its upper end and a lower portion of which is inserted through the upper end of the housing 10 to absorb rocking transmitted from the wheel 1, and a vehicle height control module 30 disposed at a lower portion of the strut assembly 20, wherein the module includes a spiral guide groove 33 in the lower portion of the strut assembly 20 and a guide member 35 which is fitted into the guide groove 33. In particular, the guide member 35 may be rotated using a rotating force from a motor 31 to move the guide member 35 along the guide groove 33 to cause the strut assembly 20 to be moved vertically to control the height of a vehicle. In other words, the housing may be formed as a barrel shape having an open upper end, and the lower end of the housing may be coupled to the side of the wheel 1 via a knuckle (not shown).

The strut assembly 20 may be coupled to the vehicle body 2 at an upper end thereof, and the lower end of the strut assembly may be inserted through the open upper end of the housing 10 to absorb and reduce vibrations and rocking transmitted from the wheel 1, preventing the vibrations and rocking from being transmitted to the vehicle body 2.

Additionally, the strut assembly 20 may include a shock absorber 22 and a spring 24, wherein an upper spring seat (not indicated) and an insulator 21 may be mounted on an upper end of the shock absorber 22 to fix the insulator 21 to the vehicle body 2. A lower spring seat 23 may be fixed to the end portion of the shock absorber 22, while a suspension spring 24 may be elastically arranged between the lower spring seat 23 and the insulator 21 to absorb vibrations transmitted from the wheel 1. Further, the shock absorber 22 may restrict the flexible action of the spring 24 to stabilize the vehicle body 2.

The vehicle height control module 30 may be disposed at a lower portion of the strut assembly 20 to allow the spiral guide groove 33 to be disposed in the lower portion of the strut assembly 20, and the guide member 35 may be fitted into the guide groove 33. In particular, the guide member 35 may be rotated using a rotating force from a motor 31 to move the guide member 35 along the guide groove 33 to cause the strut assembly 20 to be moved vertically to control the height of a vehicle. In other words, the rotating force by the motor 31 may be converted to a linear motion of the stmt assembly by the vehicle height control module 30, to move the strut assembly 20 vertically to control the height of a vehicle.

Referring to FIGS. 1 to 3, the vehicle height control module may include the motor 31 which may be configured to provide forward and backward rotations, a guide pipe 32 fixed to the lower portion of the strut assembly 20 with the spiral guide groove 33 formed in a circumference thereof, and a rotary shaft 34 disposed to fix the guide member 35 to an upper end thereof to fit the guide member 35 into the guide groove 33.

Specifically, the motor 31 may be mounted in the housing at the lower end thereof. The motor may be configured to provide forward and backward rotations by rotation of an inner rotor 31b relative to an outer stator 31a in the structure of an electric magnet. In particular, the rotary shaft 34 may be coupled to an interior of the rotor 31b, to transmit the rotating force of the rotor 31b to the rotary shaft 34 to rotate the rotary shaft 34. Furthermore, the motor 31 may be controlled by a controller 40 mounted in a vehicle, wherein the controller 40 may be an electronic control unit (ECU).

The guide pipe 32 may be fixed to the lower portion of the strut assembly 20, and may have the shape of a barrel, wherein the diameter of the top and bottom are narrower than the middle diameter, having a lower open end that covers the upper end of the rotary shaft 34. The guide pipe 32 may include the spiral guide groove 33 in the circumferential surface of the guide pipe, wherein the guide member 35 may be fitted into the spiral guide groove 33. Specifically, the guide groove 33 may include, at an end portion, a horizontal linear section in which the guide member 35 may be disposed when a vehicle travels along a substantially linear road, preventing the motor from rotating in the backward direction.

Further, the rotary shaft 34 may be rotated by the rotating force from the motor 31. The lower end of the rotary shaft may be coupled to and rotated by the rotor 31b, and the upper end of the rotary shaft may be disposed in the guide pipe 32. The guide member 35 may be fixed to the upper end of the guide pipe such that the guide member 35 is fitted into the guide groove 33 to move the guide member 35 along the guide groove 33. In other words, when the rotary shaft 34 is rotated, the guide member 35 may be guided along the guide groove 33, to move the guide member 35 vertically according to the direction in which the rotary shaft 34 rotates. In particular, the guide member 35 may be a bearing, such as a drive bearing. In other words, with a bearing structure, upon movement of the guide member 35 along the guide groove 33, friction between the guide member 35 and the guide groove 33 may be prevented, thereby contributing to substantially smooth movement of the guide member 35.

Further, a bearing B3, such as a ball bearing, may be mounted between the lower portion of the outer circumferential surface of the rotary shaft 34 and the lower portion of the inner circumferential surface of the housing 10. In other words, with the bearing B3 structure, upon movement of the rotary shaft 34, friction between the rotary shaft 34 and the housing 10 may be prevented, thereby contributing to substantially smooth movement of the rotary shaft 34.

Additionally, a bearing B2, such as a ball bearing, may be mounted between the middle portion of the outer circumferential surface of the rotary shaft 34 and the lower portion of the outer circumferential surface of the strut assembly 20. In other words, with the bearing B2 structure, upon movement of the rotary shaft 34, friction between the rotary shaft 34 and the strut assembly 20 may be prevented, thereby contributing to substantially smooth movement of the rotary shaft 34.

In other words, when the motor 31 is configured to provide rotating force to drive the rotary shaft 34, the rotary shaft may be rotated together with the guide member 35. In particular, the guide member 35 may be rotated while fitted into the guide groove 33 to restrict vertical movement of the guide member 35 and allow movement of the guide member 35 along the guide groove 33, and vertical movement of the guide pipe 32. Specifically, the guide pipe 32 may be moved together with the strut assembly 20, to move the strut assembly vertically, enabling the height of a vehicle to be controlled.

Moreover, referring to FIG. 3, a radial upper seat 36 may be disposed in a side of the upper end of the guide pipe 32, a radial lower seat 37 may be disposed in a side of the lower end of the rotary shaft 34, and an elastic member 38 may be disposed between the upper seat 36 and the lower seat 37 to provide an elastic force to the strut assembly 20. In particular, the elastic member 38 may be a compressed coil spring. The lower seat 37 may be supported and mounted on the upper end of the stator 31a of the motor 31, without being rotated together with the upper seat 36, and a spring may be elastically mounted between the upper seat 36 and the lower seat 37. In other words, when the motor 31 is configured to provide rotating force to move the guide pipe 32 vertically, the elastic member 38 (e.g., a spring) exerts a force to push the guide pipe 32 vertically, to reduce the starting torque of the motor 31 to compensate for operating torque and thus reducing load applied to the motor 31 and the housing 10.

The upper seat 36 may be supported on the inner circumferential surface of the housing 10 to mount a bearing B1 between the upper seat 36 and the housing 10. In particular, the bearing B1 may be a rolling bearing configured to prevent friction caused by slippage between the housing 10 and the upper seat 36 when a vertical stroke of a vehicle is generated due to rebounding and bumping of a vehicle.

Further, the housing 10 include, on an upper inner circumferential surface thereof, a stopper 12 configured to prevent upward movement of the strut assembly 20. In other words, when the vehicle rebounds, the strut assembly 20 may be moved vertically by the upward movement of the guide pipe 32, and when the guide pipe 32 moves vertically beyond a predetermined location, the upper seat 36 may contact the stopper 12 to prevent the guide pipe 32 from moving beyond the stopper 12.

Figure 4:
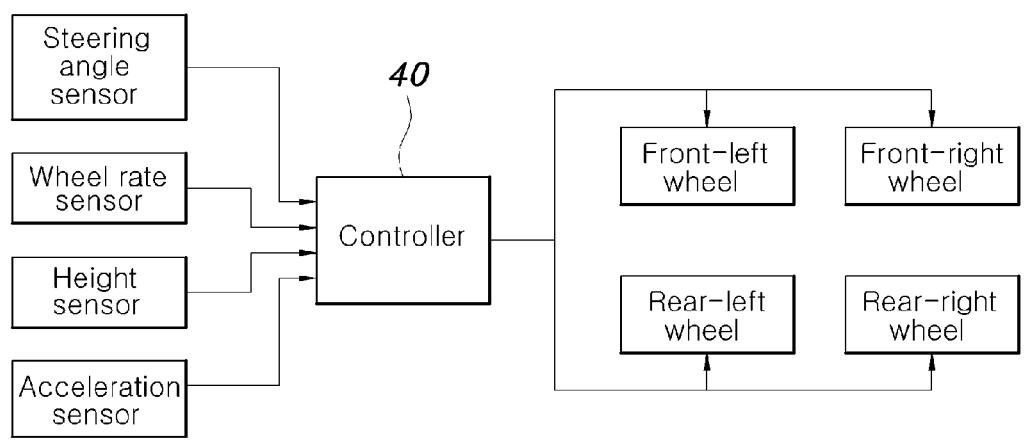
FIG. 4 is an exemplary view showing an exemplary control of a motor according to an exemplary embodiment of the present invention.

FIG. 4 is an exemplary view showing an exemplary control of the motor 31 according to the present invention. Referring to FIG. 4, a controller 40 may be configured to control the operation of the motor 31 by receiving various driving parameter values measured by a plurality of sensors mounted in a vehicle, and calculating control parameter values for the control of vehicle height based on the measured parameter values. Specifically, the vehicle height control modules 30 including the motor 31 may be separately mounted on the wheels of a vehicle, respectively, thereby increasing reliability and precision of vehicle height control.

In particular, the sensors connected to the controller 40 may include a steering angle sensor, a wheel rate sensor, a height sensor, upper and lower acceleration sensors, or the like, from which load shift, roll stiffness of front and rear wheels, loads applied to springs of respective wheels, rotating torque/direction of the respective motor 31, or the like may be calculated using the input values measured by the sensors, and thus the motors 31 mounted in the respective wheels 1 may be separately controlled based on the calculated values.

Figure 5:
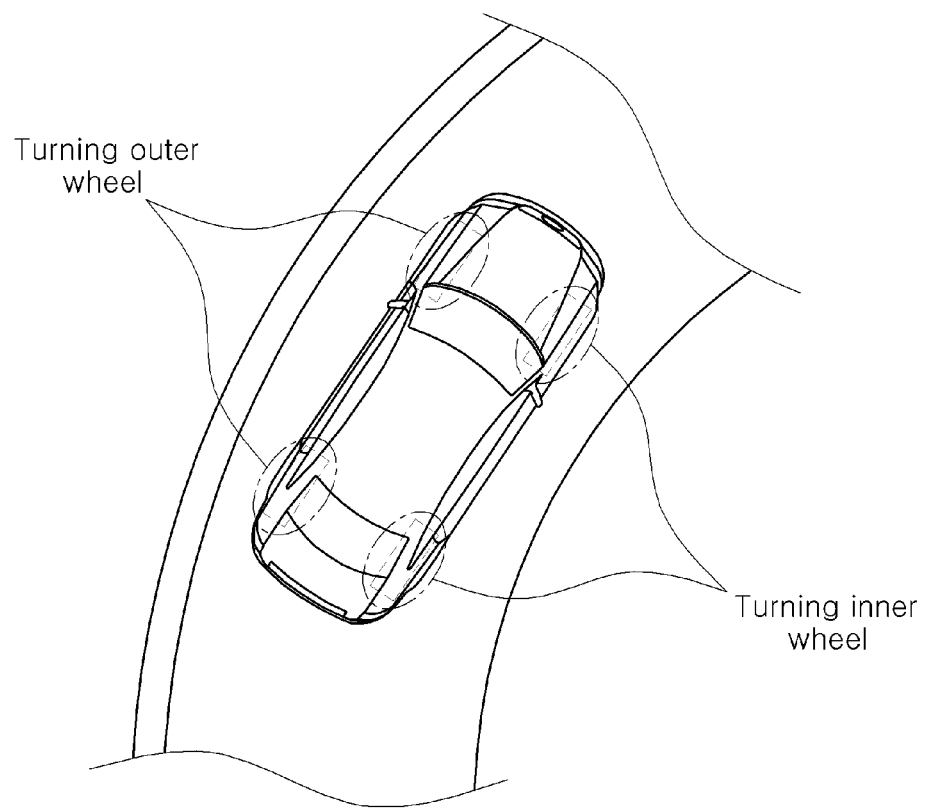
FIG. 5 is an exemplary view illustrating an exemplary control of a turning condition of a vehicle according to an exemplary embodiment of the present invention.

FIG. 5 is an exemplary view illustrating an exemplary control of a turning function of a vehicle according to the present invention. Referring to FIG. 5, when a vehicle turns, the height of the vehicle in the inner side of the turn becomes greater than that of the outer side due to the centrifugal force, thus by using the control of the motor 31, the stmt assembly 20 in the inner side of the turn may be lowered, whereas the strut assembly 20 in the outer side of the turn may be raised, thereby controlling the position of a vehicle.

Further, when a vehicle is suddenly stopped, the height of the rear of the vehicle becomes greater than that of the front of the vehicle, thus by using the control of the motor 31, the strut assembly 20 in the front of the vehicle may be raised and the stmt assembly 20 in the rear of the vehicle may be lowered, thereby stably controlling the position of the vehicle.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An electronic control suspension (ECS) system for vehicles, comprising:
   a housing having an open upper end and a lower end coupled to a wheel;
   a strut assembly coupled to a vehicle body at an upper end and a lower portion of which is inserted through the upper end of the housing to absorb rocking transmitted from the wheel; and
   a vehicle height control module disposed at a lower portion of the strut assembly, wherein the vehicle height control module includes:
      a spiral guide groove in the lower portion of the strut assembly; and
      a guide member fitted into the guide groove, wherein the guide member is rotated using a rotating force from a motor to move the guide member along the guide groove to cause the strut assembly to be moved vertically to control the height of a vehicle, wherein the vehicle height control module further includes:
   a guide pipe fixed to the lower portion of the strut assembly with the spiral guide groove formed in a circumference thereof; and
   a rotary shaft configured to fix the guide member to an upper end thereof to fit the guide member into the guide groove.

2. The ECS system according to claim 1, wherein the guide groove includes at an end portion thereof, a horizontal linear section in which the guide member is disposed when a vehicle travels on a substantially linear road.

3. The ECS system according to claim 1, wherein the guide member is a bearing.

4. The ECS system according to claim 1, wherein the housing includes on an upper inner circumferential surface thereof, a stopper configured to prevent vertical movement of the strut assembly.

5. The ECS system according to claim 1, further comprising:
   a radial upper seat disposed in a side of an upper end of the guide pipe;
   a radial lower seat disposed in a side of a lower end of the rotary shaft; and
   an elastic member disposed between the upper seat and the lower seat to provide an elastic force to the strut assembly.

6. The ECS system according to claim 5, wherein the elastic member is a spring.

7. The ECS system according to claim 5, wherein the upper seat is supported on an inner circumferential surface of the housing to mount a first bearing between the upper seat and the housing.

8. The ECS system according to claim 1, further comprising:
   a second bearing mounted between the rotary shaft and the housing; and
   a third bearing mounted between the rotary shaft and the strut assembly.

* * * * *